No. 868,437. PATENTED OCT. 15, 1907.
C. HOOVER.
VEGETABLE DISINTEGRATOR.
APPLICATION FILED AUG. 21, 1906.

2 SHEETS—SHEET 1.

Witnesses
F. E. Barry
L. D. Morrill

Inventor
Charles Hoover
By Mason Fenwick & Lawrence
Attorneys

No. 868,437. PATENTED OCT. 15, 1907.
C. HOOVER.
VEGETABLE DISINTEGRATOR.
APPLICATION FILED AUG. 21, 1906.
2 SHEETS—SHEET 2.
Fig. 3.
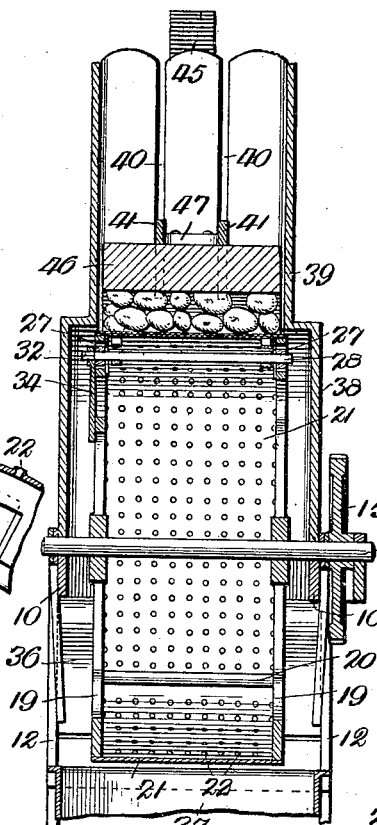
Fig. 4.
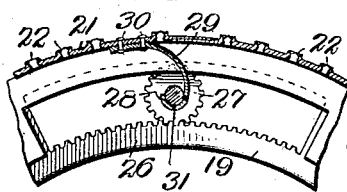
Fig. 5.
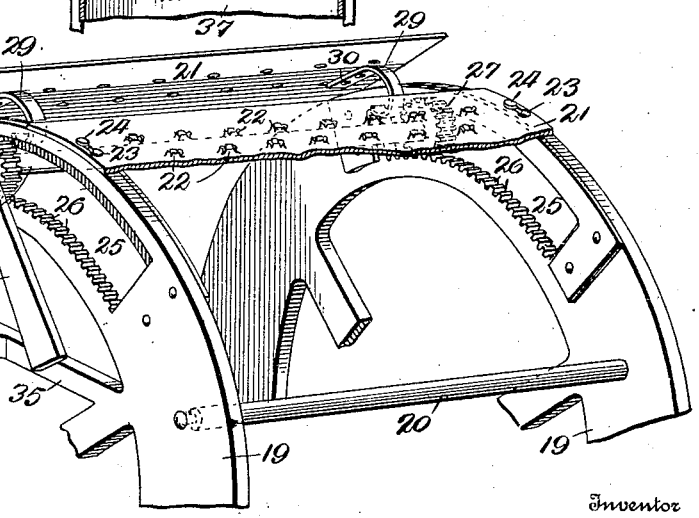
Fig. 6.
Witnesses
F. C. Barry
L. L. Morrill
Inventor
Charles Hoover,
By Mason Fenwick & Lawrence
Attorneys

UNITED STATES PATENT OFFICE.

CHARLES HOOVER, OF SEATTLE, WASHINGTON.

VEGETABLE-DISINTEGRATOR.

No. 868,437.          Specification of Letters Patent.          Patented Oct. 15, 1907.

Application filed August 21, 1906. Serial No. 331,498.

*To all whom it may concern:*

Be it known that I, CHARLES HOOVER, a citizen of the United States, residing at Seattle, in the county of King and State of Washington, have invented certain new and useful Improvements in Vegetable-Disintegrators; and I do hereby declare the following to be a full, clear, and exact description of the invention, such as will enable others skilled in the art to which it appertains to make and use the same.

This invention relates to machines for grating or disintegrating vegetables and the like, and has for an object to provide a machine embodying new and improved features of convenience, reliability and economy.

A further object of the invention is to provide in a device of the class, a rotatable grating drum having a removable grating surface, and with improved means for attaching the grating surface to the drum.

A further object of the invention is to provide in a device of the class, a hopper arranged to receive and contain the vegetables to be sliced or grated, and having an improved follower disposed within the hopper and improved means for operating the follower.

With these and other objects in view, the invention comprises certain other novel constructions, combinations and arrangements of parts, as will be hereinafter described and claimed.

Figure 1:
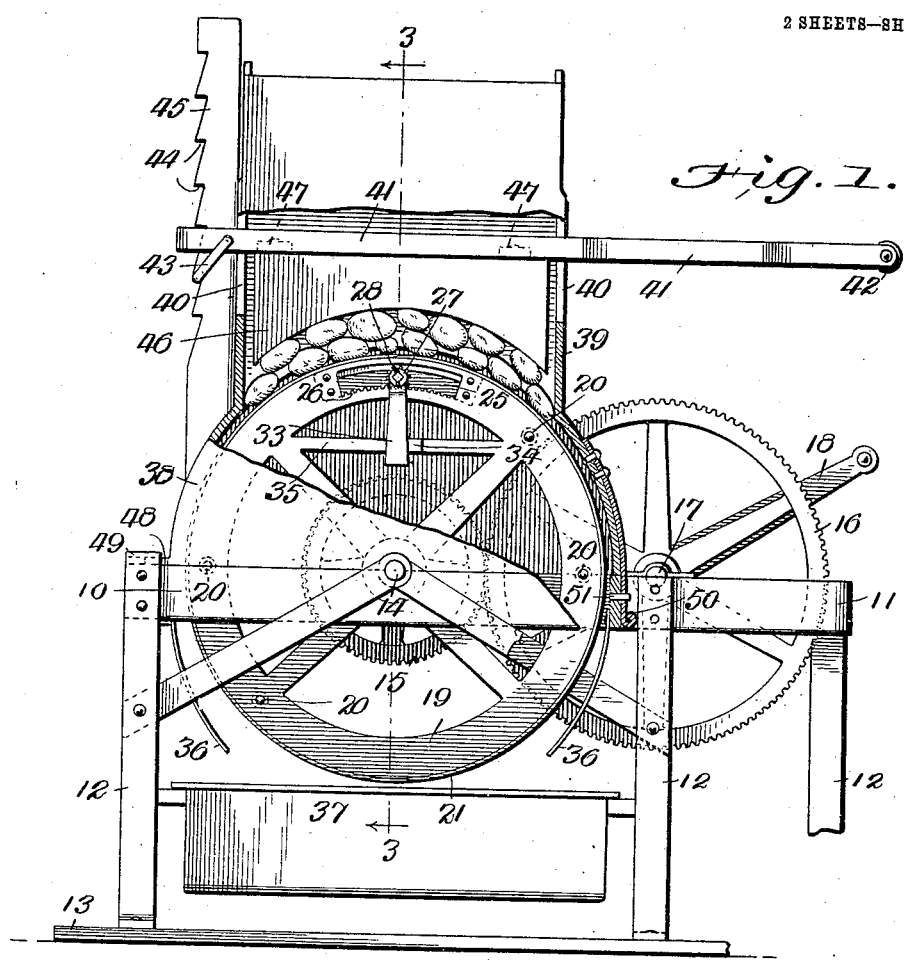
Figure 2:
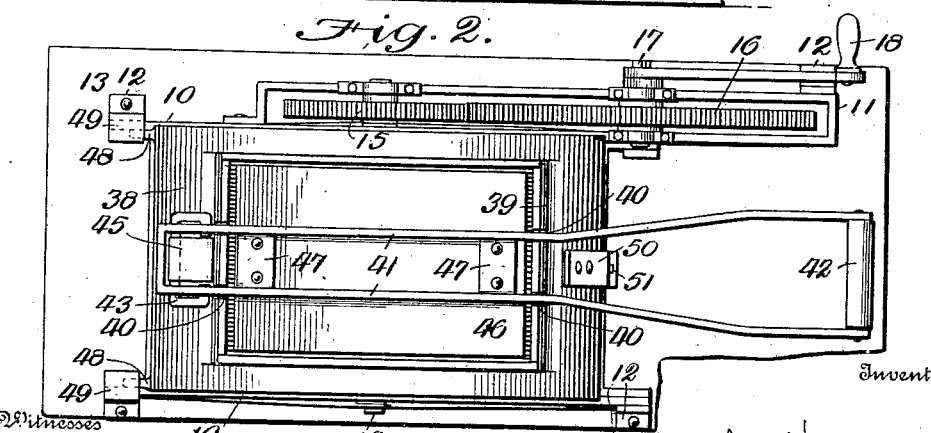

In the drawings:—Figure 1 is a view in side elevation of the improved grater or slicer with portions of the housing and hopper broken away to show the construction of the inner parts. Fig. 2 is a top plan view of the improved device. Fig. 3 is a view in vertical, transverse section taken on line 3—3 of Fig. 1. Fig. 4 is a detail, fragmentary view of the grating or slicing drum and the means for engaging and retaining the grating surface thereon. Fig. 5 is a detail fragmentary view of the grating drum periphery showing the means for attaching one end of the grating surface. Fig. 6 is a detail, fragmentary, perspective view showing the periphery of the grating drum and the ends of the grating surface, and the means for retaining the grating surface upon the drum.

Like characters of reference designate corresponding parts throughout the several views.

The grating or slicing machine, forming the subject-matter of this application, is mounted upon a frame 10, having an off-set frame portion 11 and supported in any approved manner, as upon the legs 12 secured to the base 13, or otherwise as may be approved. Upon the frame 10 is journaled a shaft 14 provided adjacent one end with a pinion 15, disposed between the side pieces of the off-set frame portion 11 and intergeared with a gear wheel 16, mounted upon a shaft 17, journaled in the said off-set frame portion 11, and provided with any approved means for applying power, as the crank 18.

Upon the shaft 14 are rigidly mounted spaced disks 19 forming about their peripheries the rotating drum and spaced apart in any approved manner, as by the spacing bars 20. About the periphery of the drum formed by the disks 19, is secured a grating or slicing member or surface 21, provided with any approved means for grating or slicing material, as the burred openings 22 punched through the said surface in the usual manner, or any approved form of cutting or slicing openings, or surfaces. The surface 21 is preferably formed of semi-flexible sheet metal, and at one end is provided with keyhole openings 23 proportioned and arranged to engage headed studs 24 so that when the said sheet 21 is placed upon the stud 24, and movable circumferentially thereupon, the heads of the studs are retained in the narrower part of the keyhole opening in the usual well known manner. The disks 19 are provided with registering segmental openings 25 having gear cogs 26 formed along the inner arc of the segmental slot and within which are mounted gears 27 rigidly connected as by the shaft 28.

The ends of the grating sheet 21 opposite the keyhole openings 23 is provided with metallic hooks 29 secured thereon in any approved manner as by the rivets 30, and positioned to be hooked, as at 31, over the shaft 28. At one end the shaft 28 is formed with a squared portion 32 upon which is mounted a resilient lever or arm 33 arranged to engage a detent 34, formed upon a bar 25 integral with one of the disks 19, or otherwise mounted thereon.

Beneath the frame 10 are disposed deflector plates 36 formed upon an arc conforming substantially to the circumference of the disks 19 and spaced therefrom at a little distance and arranged to guide and deflect the grated or sliced material to and into the receptacle 37, disposed beneath the drum.

Upon the frame 10 is erected a substantially semi-circular housing 38 arranged to cover the grating drum and continued at its upper side by the hopper 39, open at the top and communicating at the bottom with the grating drum. The hopper 39 is provided at opposite sides with one or more vertically disposed slots 40 within which is disposed to operate a lever 41 having an extended end, provided with a hand-hold 42 in operative proximity to the crank 18 and its opposite end provided with a bail 43 arranged to engage the inclined notches 44 of an upright 45 at the rear of the hopper. The lever 41 carries a follower 46 proportioned to move vertically and slidably within the hopper and to substantially fill the same in a horizontal plane, and secured to the said lever in any approved manner, as by the clips 47.

In operation the grating sheet or surface 21 is engaged at one end by means of the keyhole slots 23 upon studs 24 of the disk 19 of the grating drum, and after being brought into contact with the peripheries of the said drums throughout substantially their entire circumference the hooks 29 are hooked over the shaft 28 and the said sheet tightened by rotating the shaft 28 by means of the arm or lever 33. The said shaft traveling along the segmental slots 25 carries the end of the sheet therewith until the necessary tension is exerted. When the grating sheet 21 has been drawn taut upon the disks the arm 33 is caught behind the detent 34 and the sheet retained in such taut position. The drum, provided with the grating sheet is then journaled within the frame by introducing the shaft 14 into the semi-circular recesses formed therein and the housing 38 carrying the hopper 39 disposed thereupon. The hopper 38 is provided with fingers 48 arranged to engage beneath upwardly arched portions 49 formed upon the upper extremities of the legs 12 at the rear end of the machine. At the end opposite the fingers 48, the housing 38 is provided with a resilient catch member 50 arranged to engage a pin 51 carried by one of the frame pieces of the frame 10, and by which the housing 38 is held in operative position upon the frame.

Vegetables or other material of any kind, are then disposed within the hopper 39 and the follower 46 inserted within the hopper to bear upon the top or upper surface of the contained vegetables. The bail 43 is then engaged within one of the notches 44 and pressure upon the contained vegetables applied by exerting pressure upon the hand-hold 42. The crank 18 being then rotated, rotating thereby the gears 16 and 15, and the drum 19, the grating surface is moved in contact with the contained vegetables and the portions removed are carried by the said surface about within the housing 38, and discharged into the receptacle 37.

What I claim is:—

1. In a device of the character described, the combination of a support, a drum mounted upon the support and having segmental slots formed in the ends thereof, said slots being provided with racks along one of their sides, a shaft passing through the slots, pinions carried by the shaft and engaging the racks, a disintegrating sheet wrapped around the drum and having one edge connected to the drum and the opposite edge to the shaft, means for rotating the shaft to produce the required tension in the disintegrating sheet and means to lock the shaft against backward movement.

2. In a device of the class described, a rotating drum comprising spaced disks having registering segmental slots formed therein, a disintegrating sheet embracing said drum circumferentially and having one end removably secured thereto, a rack formed along the inner segmental curve of the slot, pinions mounted within the slots and engaging the segmental rack, a shaft extending longitudinally of the drum and rigidly connected with the pinions, straps carried by the disintegrating sheet arranged to engage the shaft, means for rotating the shaft and gears and to move the gears and shaft circumferentially relative to the drum within the segmental slots, and means to retain the gears and shaft from retroactive movement.

3. In a device of the class described, a rotating drum comprising spaced disks having registering segmental openings formed adjacent their peripheries, racks formed along the inner segmental curves of the openings, a disintegrating sheet circumferentially embracing the drum and removably secured at one end thereto, pinions disposed within the segmental openings and in engagement with the segmental rack, a shaft rigidly connecting the pinions and extended longitudinally of the drum, straps carried by the disintegrating sheet and arranged to engage the shaft, means to rotate the gear and shaft to move the gear and shaft circumferentially of the drum, means carried by the shaft to retain the shaft and gears against retroactive movement, a hopper disposed above the drum and having an open lower end in communication therewith, and provided with vertically disposed slots, a follower disposed within the hopper, a lever rigidly secured to the follower and extending without the hopper through the slots, a rack disposed vertically adjacent and without the hopper, and a bail carried by the lever arranged to engage the rack.

4. In a device of the character described, the combination of a support, a drum rotatably mounted upon the support and having openings formed in the ends thereof, a shaft passing through the openings and movable circumferentially of the drum, a disintegrating sheet wrapped around the drum and having one end connected to the drum and the opposite end to the shaft, means for moving the shaft circumferentially of the drum to produce the required tension in the disintegrating sheet and means to lock the shaft against backward movement.

In testimony whereof I affix my signature in presence of two witnesses.

CHARLES HOOVER.

Witnesses:
 G. WARD KEMP,
 CHAS. P. CARTWRIGHT.